United States Patent
Xiang et al.

(10) Patent No.: US 7,571,343 B1
(45) Date of Patent: Aug. 4, 2009

(54) HANDLING SEQUENCE NUMBERS AND/OR AN ANTI-REPLAY WINDOW AFTER FAILOVER BETWEEN SERVERS

(75) Inventors: Jing Xiang, Acton, MA (US);
 Shreedhar Shirgurkar, Chelmsford, MA (US); Vladimir Senkov, Chelmsford, MA (US); Ramin Taraz, Lexington, MA (US)

(73) Assignee: Nortel Networks Limited, St. Laurent, Quebec (CA)

( * ) Notice: Subject to any disclaimer, the term of this patent is extended or adjusted under 35 U.S.C. 154(b) by 392 days.

(21) Appl. No.: 11/513,704

(22) Filed: Aug. 31, 2006

(51) Int. Cl.
 *G06F 11/00* (2006.01)
(52) U.S. Cl. .......................... 714/2; 709/203
(58) Field of Classification Search .............. 714/2, 714/4, 11–13; 709/203, 224, 230
 See application file for complete search history.

(56) References Cited

U.S. PATENT DOCUMENTS

| | | | |
|---|---|---|---|
| 6,286,032 B1* | 9/2001 | Oberlander et al. | 709/203 |
| 7,213,063 B2* | 5/2007 | Bressoud et al. | 709/223 |
| 2004/0199808 A1* | 10/2004 | Freimuth et al. | 714/4 |
| 2005/0256972 A1* | 11/2005 | Cochran et al. | 709/245 |
| 2006/0179147 A1* | 8/2006 | Tran et al. | 709/227 |
| 2006/0248126 A1* | 11/2006 | Melander | 707/202 |

OTHER PUBLICATIONS

RFC 791, "Internet Protocol DARPA Internet Program Protocol Specification," pp. 1-45 (Sep. 1981).
RFC 2401, "Security Architecture for the Internet Protocol," pp. 1-59 (Nov. 1998).
RFC 2406, "IP Encapsulating Security Payload (ESP)," pp. 1-22 (Nov. 1998).
RFC 2408, "Internet Security Association and Key Management Protocol (ISAKMP)," pp. 1-86 (Nov. 1998).
RFC 3768, "Virtual Router Redundancy Protocol (VRRP)," pp. 1-27 (Apr. 2004).
RFC 4301, "Security Architecture for the Internet Protocol," pp. 1-101 (Dec. 2005).
RFC 4302, "IP Authentication Header," pp. 1-34 (Dec. 2005).
RFC 4303, "IP Encapsulating Security Payload (ESP)," pp. 1-44 (Dec. 2005).
RFC 4306, "Internet Key Exchange (IKEv2) Protocol," pp. 1-98 (Dec. 2005).

* cited by examiner

*Primary Examiner*—Dieu-Minh Le
(74) *Attorney, Agent, or Firm*—Trop, Pruner & Hu, P.C.

(57) ABSTRACT

To prevent loss of packets due to failover between server systems in which a failover mechanism is provided in a first server system to enable a second server system to failover to the first server system, the first server system includes a first sequence number space that is different from a second sequence number space in the second server system. The first and second sequence number spaces are part of a total sequence number space. After failover from the second server system to the first server system, the first server system sends packets containing sequence numbers in the first sequence number space which are defined by a security protocol.

21 Claims, 3 Drawing Sheets

HANDLING SEQUENCE NUMBERS AND/OR AN ANTI-REPLAY WINDOW AFTER FAILOVER BETWEEN SERVERS

TECHNICAL FIELD

The invention relates generally to handling sequence numbers and/or an anti-replay window after failover between servers.

BACKGROUND

Many types of communications are possible over data networks, including electronic mail, web browsing, file downloads, electronic commerce transactions, voice or other forms of real-time, interactive communications, and so forth. Data networks include private networks, such as local area networks (LANs) or wide area networks (WANs), and public networks, such as the Internet. Private networks are networks in which access is restricted to authorized users, while public networks are generally accessible to everyone.

To prevent unauthorized access or interception of data communicated over data networks, various security protocols have been implemented to allow for encryption of data and authentication of sources of data. One such security protocol is the Internet Protocol Security (IPsec) protocol, which provides for secure communications over Internet Protocol (IP) data networks.

IPsec defines packets that have headers containing sequence numbers. The sequence numbers are checked by a receiving device, where packets containing duplicate sequence numbers (duplicates of sequence numbers of previously received packets) within a sliding anti-replay window are rejected. The anti-replay window has a certain size (with the default window size being 32). A receiving device keeps track of a current sequence number, with the sliding anti-replay window ending at the current sequence number. In other words, if the current sequence number is 35, then the sliding window will start at sequence number 4 and end at sequence number 35 (assuming window size of 32). In the above example, upon receipt of a packet having a sequence number, the receiving device checks to determine whether the sequence number of the received packet is within the current sliding window, and if so, the receiving device then checks to see if the sequence number of the received packet is a duplicate of a sequence number of a previously received packet. If not a duplicate, the receiving device accepts the received packet. However, if the receiving device determines that the received packet has a sequence number that is a duplicate, the received packet is rejected (dropped).

Checking for duplicate sequence numbers prevents denial-of-service (DoS) attacks, in which an attacker captures packets and replays the packets (usually at a fast rate) by sending them over a network for the purpose of overwhelming the network or a particular node in the network, or to otherwise gain unauthorized access of the network. Networks that employ security protocols, such as IPsec, perform integrity checks of packets so that an attacker cannot just change the sequence numbers of the packets to avoid duplication, since changing sequence numbers will change the signature of the packet such that an integrity check will fail.

The anti-replay mechanism, although reliable in many applications, may exhibit problems when used in networks that employ redundancy schemes that involve failing over from primary servers to secondary servers (such as failing over from primary switches or routers to secondary switches or routers). When a primary server fails, the secondary server may not be aware of the sequence numbers and anti-replay window used by the primary server. On the transmission side, the secondary server may not know the current sequence number that should be used for sending packets. On the receive side, the secondary server may not know the current position of the anti-replay window so that the secondary server would not be able to determine the proper anti-replay window for performing checks for DoS attacks. As a result, the secondary server may drop packets that the secondary server should otherwise have accepted.

One conventional technique of addressing this issue is to continually perform communications between the primary server and secondary server, where the current send sequence number (sequence number of an outbound packet from the server) is communicated from the primary server to the secondary server for every n packets sent, and the current anti-replay window is communicated from the primary server to the secondary server for every n packets received. Although this mechanism allows the secondary server to maintain up-to-date sequence number and anti-replay window information of the primary server, the downside is that valuable communications bandwidth is consumed by the constant communications between primary and secondary servers.

SUMMARY

In general, methods and apparatus are provided to prevent loss of packets due to failover between servers that communicate packets having sequence numbers defined by a security protocol. In one embodiment, a first sequence number space is provided in a first server that is different from a second sequence number space in a second server.

Other or alternative features will become apparent from the following description, from the drawings, and from the claims.

DETAILED DESCRIPTION

In the following description, numerous details are set forth to provide an understanding of some embodiments. However, it will be understood by those skilled in the art that some embodiments may be practiced without these details and that numerous variations or modifications from the described embodiments may be possible.

Figure 1:
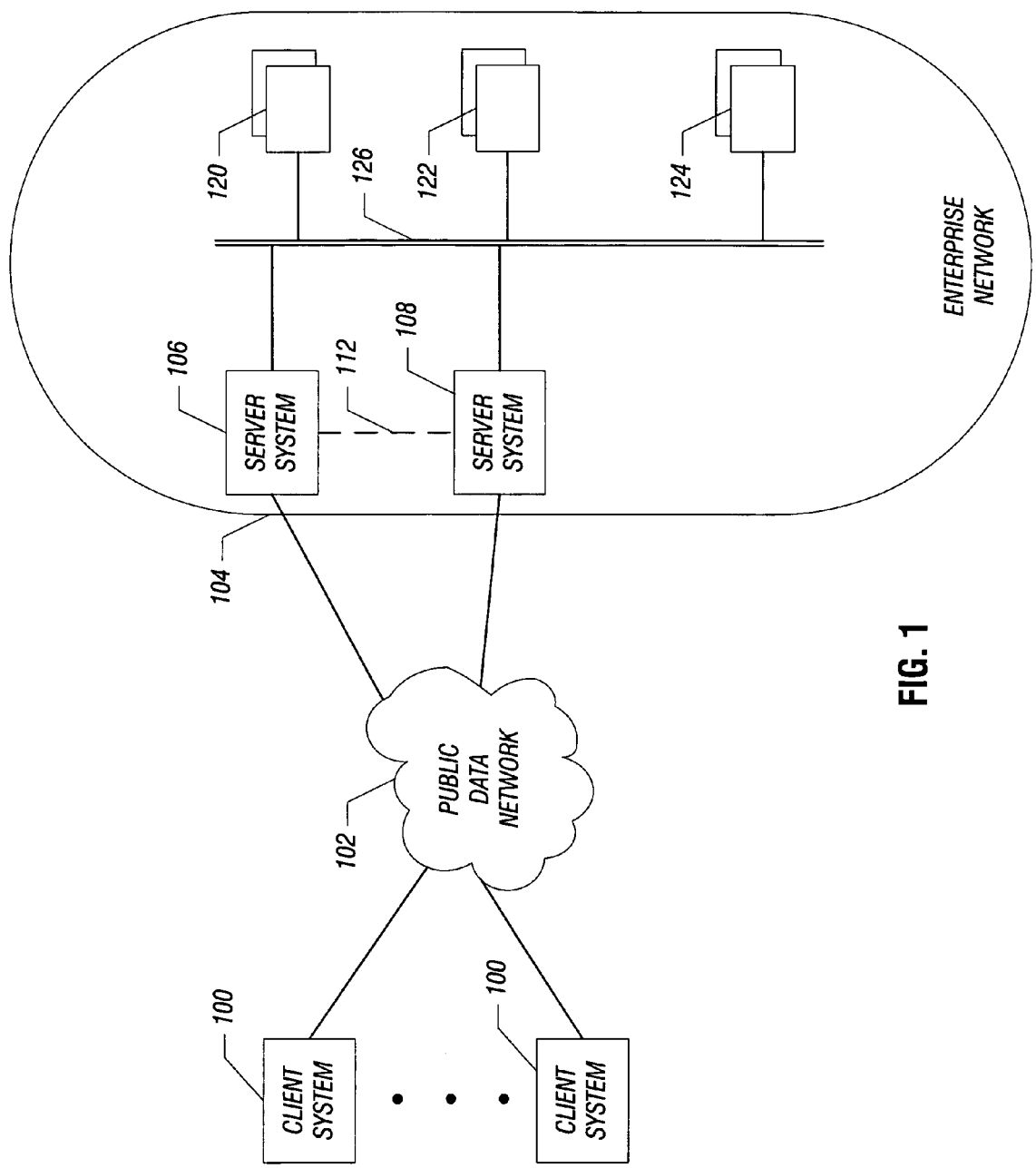
FIG. 1 is a block diagram of an arrangement of client systems and server systems that incorporate an embodiment of the invention.

FIG. 1 shows an arrangement of a communications network in which client systems 100 (e.g., computers, appliances, personal digital assistants, mobile telephones, etc.) are coupled over a public data network 102 to an enterprise network 104 that has multiple server systems 106, 108. The server systems 106, 108 are in turn coupled to various nodes 120, 122, 124 over data link(s) 126 in the enterprise network 104. Although two server systems 106, 108 are depicted in FIG. 1, it is contemplated that other embodiments can use different numbers of server systems and nodes. Examples of the nodes 120, 122, and 124 include client systems, storage nodes, application server nodes, and so forth, that are part of the enterprise network 104. Examples of the server systems 106, 108 include switches, routers, and any other type of device that enables client systems 100 to establish secure communications with the enterprise network 104 over the public data network 102. The enterprise network 104 is an example of a private network that is accessible by only authorized users.

The client systems 100 establish communications sessions through corresponding server systems 106, 108 with the enterprise network nodes 120, 122, 124. In each session, packets are communicated through a server system between a client system and an enterprise network node.

An example of the public data network 102 is the Internet, in which Internet Protocol (IP) communications can be performed. One version of IP is described in Request for Comments (RFC) 791, entitled "Internet Protocol," dated September 1981; and another version of IP is described in RFC 2460, entitled "Internet Protocol, Version 6 (IPv6) Specification," dated December 1998.

To enable establishment of secure communications (such as virtual private networks or VPNs) between the client systems 100 and the enterprise network 104 over the public data network 102, a security protocol such as IP Security (IPsec) protocol can be used. IPsec is described in part by RFC 4301, entitled "Security Architecture for the Internet Protocol," dated December 2005. Under IPsec, an Internet Security Association and Key Management Protocol (ISAKMP) defines procedures and packet formats to establish, negotiate, and provide security services between network entities. Once the desired security services have been negotiated between two entities, traffic is carried in IP Encapsulating Security Payload (ESP) packets or Authentication Header (AH) packets. ISAKMP is described in RFC 4306, entitled "Internet Security Association and Key Management Protocol (ISAKMP)," dated December 2005; ESP is described in RFC 4303, entitled "IP Encapsulating Security Payload (ESP)," dated December 2005; and AH is described in RFC 4302, entitled "IP Authentication Header," dated December 2005.

A VPN includes a public network (e.g., network 102) as the primary transport medium, with communications over the public network protected by a security protocol. Access to a private network from a remote location (such as from a branch office or by a remote user, such as at client system 100) is often desirable. Rather than using direct dial-up or dedicated point-to-point lines that are relatively expensive to maintain, a VPN between two endpoints can be established to provide secure communications with the private network over a public network. By using a VPN, a secure, convenient, and cost-effective mechanism is provided for users who desire to remotely access a private network. To enable establishment of VPNs between client systems 100 and the enterprise network 104, VPN clients are included in the client systems 100 and VPN servers are provided in the server systems 106, 108.

A further feature of the server systems 106, 108 is that a redundancy scheme is implemented by the server systems so that, in case of failure of one of the server systems, failover can be performed to another one of the server systems. For example, the server system 106 may be designated a primary server system, while the server system 108 is designated as the secondary server system to the primary server system 106. If the primary server system 106 should fail, then failover would be performed to the secondary server system 108.

To enable failover, a redundancy protocol link 112 is provided between server systems 106 and 108. In one example embodiment, the redundancy scheme used by the server systems 106, 108 includes the Virtual Router Redundancy Protocol (VRRP), as described in RFC 3768, dated April 2004. However, in other embodiments, other protocols (whether standardized protocols or proprietary protocols) can be used for performing failover between server systems in the enterprise network 104. Although the redundancy protocol link 112 is depicted separately from the data link(s) 126, it is noted that the redundancy protocol link 112 is actually provided over the data link(s) 126 according to some implementations.

In establishing a VPN using IPsec, a security association is established between a VPN client and a VPN server residing in a client system and server system, respectively. A security association (SA) determines the encryption and authentication algorithms to apply in the secure communications. An IPsec packet is a packet that contains either an ESP header or an AH header. More generally, a packet that is protected by a security protocol, such as IPsec, has a security header. This security header, such as an AH header or ESP header, contains a sequence number that can be used by a receiving device (either the client system or the server system) to reject (drop) packets containing duplicate sequence numbers (within an anti-replay window). The ability to reject packets containing duplicate sequence numbers helps prevent denial-of-service (DoS) attacks, in which attackers capture packets and replay the packets in an attempt to overwhelm a network or particular node(s) in the network, or to otherwise gain unauthorized access of the network.

From the perspective of a server system, both outbound packets (packets sent to a client system 100 over the public data network 102) and inbound packets (packets received over the public data network 102 from a client system 100) contain sequence numbers. The sequence numbers of outbound packets are referred to as outbound (or send) sequence numbers, while the sequence numbers of inbound packets are referred to as inbound (or receive) sequence numbers.

Each IPsec endpoint (such as each server system or client system) defines a sliding anti-replay window to check for duplicate sequence numbers in inbound packets. The client or server system maintains the current inbound sequence number, with the sliding anti-replay window ending in the current inbound sequence number. The sliding window has a pre-defined size, where a default window size is 32 (although other window sizes can be used in other implementations). A mask is also maintained by the server system to track sequence numbers within the sliding window that have already been received.

As an example, assume a window size of 32 and a current inbound sequence number of 35, then the anti-replay window starts at inbound sequence number 4 and ends at inbound sequence number 35. Assume further an example mask value of 0xf0000003, which means that packets having sequence numbers 4, 5, 6, 7, 34, and 35 have been received. Note that the mask value referenced above is a hexadecimal value that has eight hexadecimal digits to correspond to 32 bit positions representing corresponding 32 sequence numbers. The leftmost bit of the mask refers to the left edge of the sliding window, while the rightmost bit of the mask refers to the right edge of the sliding window (representing sequence number 35 in the above example).

As additional inbound packets containing other sequence numbers are received, the mask value is updated. Thus, if a packet containing sequence number 8 is received, then the mask value is updated to 0xfc0003. If an inbound packet contains a sequence number that is indicated by the mask value as already having been received, then that sequence number is considered a duplicate sequence number, and the received inbound packet is rejected by the receiving server. Note also that any inbound packet having a sequence number that is below the lowest value of the sliding window is also rejected. Thus, in the above example, the lowest sequence number for the sliding window is sequence number 4. Any inbound packet received having any of sequence numbers 0, 1, 2, 3 will be rejected. If an inbound packet has a sequence number that is larger than the highest sequence number of the sliding window, then the current sequence number is updated to the larger sequence number of the received inbound packet, and the sliding window is accordingly adjusted such that the sliding window ends at the larger sequence number. The mask value is also changed to reflect the new sliding window.

In the outbound direction (from the perspective of either the client system or the server system), a counter is maintained (in the client system or server system) to increment sequence numbers with each outbound packet transmitted (by the client system or server system).

Note that different sessions involving a server system and one or more client systems are associated with respective independent sets of inbound and outbound sequence numbers. In other words, a first session involving the server system and a particular client system will have its corresponding set of a current inbound sequence number and current outbound sequence number at the server system, while a second session involving the server system and the particular client system or another client system will have another set of a current inbound sequence number and current outbound sequence number at the server system.

In accordance with some embodiments, a mechanism is provided to prevent loss of packets when failing over from a primary server system to a secondary server system even though the anti-replay technique with sequence numbers discussed above is utilized. The mechanism to prevent loss of packets is implemented without use of continual communication between the primary and secondary server systems for updating sequence number and sliding window information. As a result, the bandwidth of communications links coupling the server systems is not wasted.

On the outbound side, according to an embodiment, the sequence number space is divided in half between the primary server system and the secondary server system. In one implementation, the primary server system uses the first half of the sequence number space, while the secondary server system uses the second half of the sequence number space. For example, assuming that the sequence number is 32 bits in length, then the sequence number space is $2^{32}$ in size. If the uppermost bit of a sequence number is used to divide the sequence number space, then the primary sequence number space is 0 to 0x7fffffff (the lower half of the space), and the secondary sequence number space is 0x80000000 to 0xffffffff (the upper half of the space). In this embodiment, each of the sequence numbers in the secondary sequence number space is larger than any of the sequence numbers in the primary sequence number space. Note, however, that in other embodiments, other bits of a sequence number can be used to distinguish between the primary and secondary sequence number spaces. For example, the lowermost bit of the sequence number can be used for dividing between the two sequence number spaces, in which case the primary sequence number space would include even sequence numbers, while the secondary sequence number space would include odd sequence numbers.

The division of the sequence number space between the primary server and a secondary server is used for outbound sequence numbers (from the perspective of the server system). Thus, outbound packets from the primary server system will use sequence numbers in the first primary sequence number space, while outbound packets from the secondary server system (after failover has occurred) employs sequence numbers in the second sequence number space. Note that, in some embodiments, the sequence numbers of the secondary sequence number space are larger than the sequence numbers of the first sequence number space. As a result, after failover has occurred, any outbound packets sent from the secondary server system will not be dropped by the client system, since the sequence numbers of these outbound packets from the secondary server system as received by the client system are larger than the current inbound sequence number for inbound packets at the client system. As noted above, when a received packet at a receiving device has a sequence number larger than the current inbound sequence number, then the current inbound sequence number is simply set equal to the larger sequence number and the sliding window and mask value are adjusted accordingly. The received packet having the larger sequence number is not dropped by the receiving device. In this way, packets sent by the secondary server system, after failover from the primary server system, are not lost due to dropping by the destination client system.

For the inbound direction at the server system, after failover has occurred, the secondary server system resets the current inbound sequence number to zero and the mask value to 0x00000000. This ensures that any packets received by the secondary server system from a client system will not be dropped as a result of failover. However, in some cases, the resetting of the current inbound sequence number to zero and the mask value to 0x00000000 allows the possibility of receiving duplicate packets that were previously received by the primary server system and forwarded onto a node 120, 122, 124 in the enterprise network 104. However, the number of duplicate sequence numbers that can be replayed by an attacker is limited to the number of sequence numbers of a sliding window (e.g., 32). This small number of duplicates would not overwhelm or significantly degrade service in the enterprise network 104.

Figure 2:
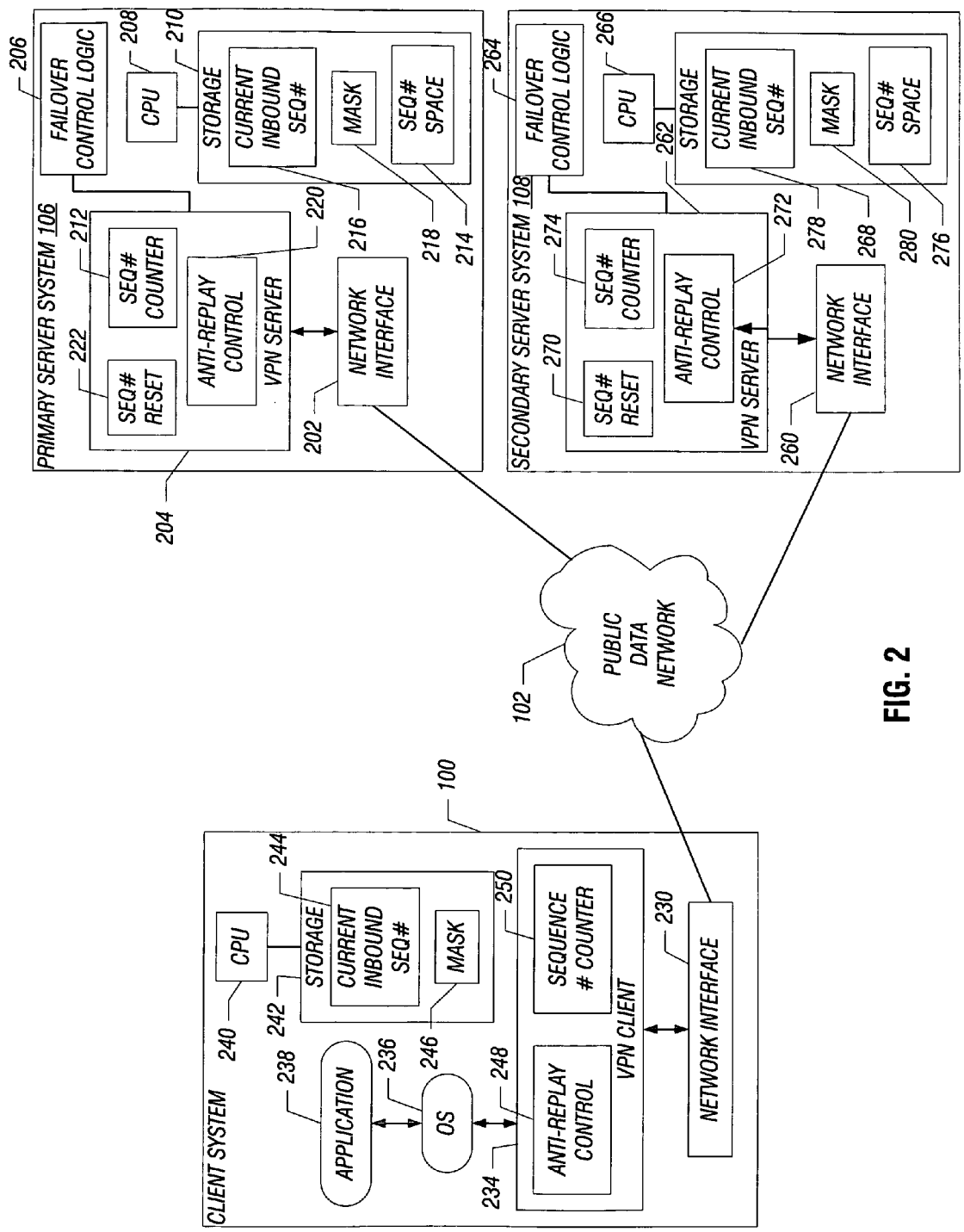
FIG. 2 shows components of an example client system and primary and secondary server systems, in accordance with an embodiment.

FIG. 2 illustrates components of the client system 100, the primary server system 106, and the secondary server system 108, according to an embodiment. The same components of the primary and secondary server systems can exist in the other server systems of the enterprise network 104.

The primary server system 106 includes a network interface 202 that allows the primary server system 106 to communicate over the public data network 102 with the client system 100. Note that the primary server system 106 may also include a second network interface (not shown) for connection to the data link(s) 126 of the enterprise network 104. The primary server system 106 also includes a VPN server 204 that enables establishment of a VPN using a security protocol, such as IPsec, with the client system 100 over the public data network 102.

The primary server system 106 also includes failover control logic 206 to allow failover between the primary server system 106 and the secondary server system 108. The primary server system 106 further includes a central processing unit (CPU) 208 or multiple CPUs connected to a storage 210 (which can be implemented with volatile memory devices or persistent storage devices such as magnetic disk-based storage devices, optical disk-based storage devices, etc.). Software in the server system 106, such as the VPN server 204 and failover control logic 206, is executable on the CPU 208.

The VPN server 204 uses a sequence number counter 212 that provides outbound sequence numbers for outbound packets. The sequence number counter 212 uses sequence numbers in a first address space (which according to some embodiments is one half of the address space that the primary server system 106 would conventionally have been able to use). The first sequence number space can be hard coded into the sequence number counter 212, or alternatively, the sequence number space can be defined using information 214 stored in the storage 210. The storage 210 further stores the current inbound sequence number 216, which is equal to the largest sequence number of an inbound packet received from the client system 100. As discussed above, according to some implementations, this current inbound sequence number 216 defines the right edge of the sliding window used for anti-replay purposes. The storage 210 also stores the current mask value representing sequence numbers that have been received in the current sliding window by the primary server system 106 from the client system 100.

The VPN server 204 includes anti-replay control logic 220 that uses the current inbound sequence number 216 and mask value 218 to detect duplicate sequence numbers. Any received inbound packet having a duplicate inbound sequence number is rejected (dropped). The VPN server 204 according to some embodiments also includes sequence number reset logic 222 that resets the current inbound sequence number 216 and mask value 218 in response to a failover event (assuming the server system 106 is a secondary server system for another server system).

The server system 108 contains identical components as the server system 106, including a network interface 260, a VPN server 262, failover control logic 264, CPU(s) 266, and storage 268. The VPN server 262 similarly includes sequence number reset logic 270, anti-replay control logic 272, and a sequence number counter 274 (which increments sequence numbers in a second sequence number space). Again, the second sequence number space can be hard-coded into the counter 274 or stored as information 276 in storage 268. The storage 268 also stores the current inbound sequence number 278 and a current mask value 280.

The client system 100 also includes a network interface 230 that enables the client system 100 to communicate over the public data network 102. In addition, the client system 100 includes a VPN client 234 to establish a VPN with the VPN server 204 or VPN server 262.

The client system 100 further includes an operating system 236 and application software 238. Also, the client system 100 includes a CPU 240 (connected to storage 242) on which software in the client system is executable.

The storage 242 of the client system 100 stores a current inbound sequence number 244 (that corresponds to the largest sequence number of an inbound packet received from the server system (106 or 108)) and a current mask value 246 indicating sequence numbers within the current sliding window that have already been received by the client system 100. The VPN client 234 includes anti-replay control logic 248 and a sequence number counter 250 for providing sequence numbers for outbound packets from the client system 100 to the server system.

In accordance with some embodiments, the failover control logic 206 in the server system 106 and the failover control logic 264 in the server system 108 implements the Virtual Router Redundancy Protocol (VRRP), as mentioned above. According to VRRP, if the server system 106 is the primary server system, and the server system 108 is the secondary server system, then the failover control logic 206 in the primary server system 106 is in the Master state, while the failover control logic 264 in the secondary server system 108 is in a Backup state. The failover control logic 264 in the Backup state monitors the availability and state of the primary server system 106. The failover control logic 264 in the Backup state has a Master_Down timer that expires after a predefined period to indicate that no communication has been received from the primary server system in some amount of time, which indicates that the primary server system 106 is down. In response, the failover control logic 264 transitions to the Master state to take over the IP address(es) of the primary server system 106 such that packets that should be routed through the primary server system 106 are routed through the secondary server system 108.

Figure 3:
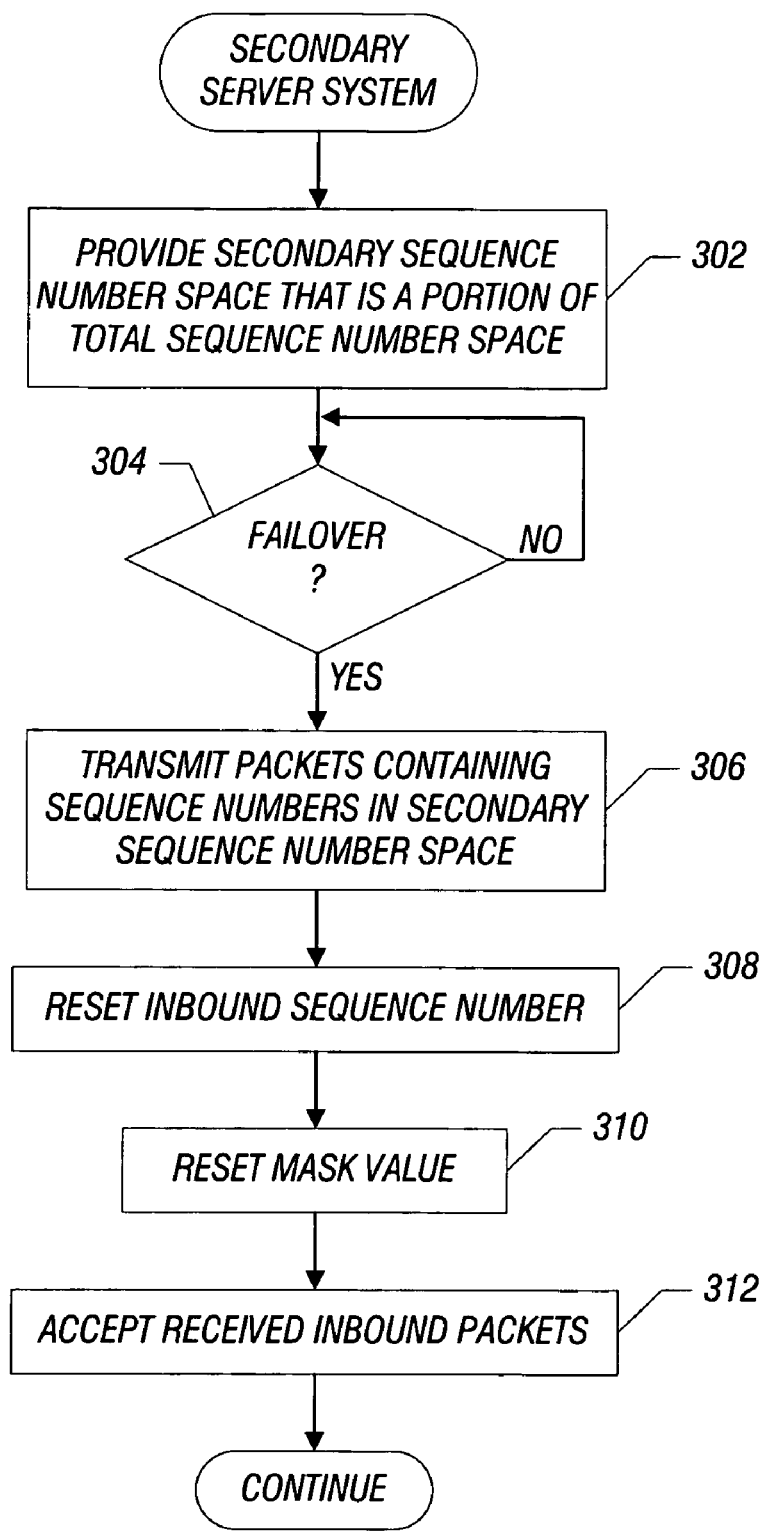
FIG. 3 is a flow diagram of a process performed by a secondary server system, according to an embodiment.

FIG. 3 illustrates a process performed by the secondary server system, in accordance with some embodiments. The secondary server system provides (at 302) a secondary sequence number space that is a portion (e.g., half) of the total sequence number space, where the other portion of the total sequence number space resides in the primary server system. The term "total sequence number space" refers to the entire sequence number space that is available based on the total number of bits of the sequence number. Providing the secondary sequence number space comprises providing the sequence number counter 274 in the secondary server system that counts in the secondary sequence number space (either hard-coded or based on stored information 276).

The failover control logic 264 in the secondary server system determines (at 304) if a failover has occurred from the primary server system to the secondary server system. If so, then the secondary server system transmits (at 306) packets containing sequence numbers in the secondary sequence number space to the client system. Also, after failover has been detected, the sequence number reset logic 270 in the secondary server system resets (at 308) the current inbound sequence number, and also resets (at 310) the current mask value.

With the reset current inbound sequence number and reset mask value, the anti-replay control logic 272 in the secondary server system is able to accept (at 312) receive packets from the client system. In this way, the likelihood of lost packets due to improper rejection of packets is reduced. Resetting the current inbound sequence number and the mask value addresses the issue of the secondary server system not knowing what those values were at the failed primary server system.

Instructions of the various software modules discussed herein (e.g., VPN server, failover control logic, etc.) are loaded for execution on corresponding processors (such as CPUs 208, 266 in FIG. 2). Processors include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the software) are stored in respective storage devices, which are implemented as one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

The instructions of the software are loaded or transported to each entity in one of many different ways. For example, code segments including instructions stored on floppy disks, CD or DVD media, a hard disk, or transported through a network interface card, modem, or other interface device are loaded into the entity and executed as corresponding software routines or modules. In the loading or transport process, data signals that are embodied in carrier waves (transmitted over telephone lines, network lines, wireless links, cables, and the like) communicate the code segments, including instructions, to the entity. Such carrier waves are in the form of electrical, optical, acoustical, electromagnetic, or other types of signals.

While some embodiments have been disclosed with respect to a limited number of embodiments, those skilled in the art will appreciate numerous modifications and variations there from. It is intended that the appended claims cover such modifications and variations as fall within the true spirit and scope of some embodiments.

What is claimed is:

1. A method to prevent loss of packets due to failover between server systems, comprising:
    providing a failover mechanism at a first server system to enable a second server system to failover to the first server system;
    providing a first sequence number space in the first server system that is different from a second sequence number space in the second server system, wherein the first and second sequence number spaces are part of a total sequence number space; and
    after failover from the second server system to the first server system, the first server system sending, to a client system, packets having sequence numbers in the first sequence number space, wherein the sequence numbers are defined by a security protocol, wherein the sequence numbers in the first sequence number space contained in the packets sent by the first server system to the client system differ from sequence numbers in the second sequence number space in packets sent by the second server system to the client system prior to the failover.

2. The method of claim 1, wherein providing the first sequence number space comprises providing a sequence number space that is half of the total sequence number space, wherein the second sequence number space is the other half of the total sequence number space, and wherein the total sequence number space is defined by a number of bits of a sequence number.

3. The method of claim 1, wherein the first server system sending packets having sequence numbers defined by the security protocol comprises the first server system sending packets having sequence numbers defined by an Internet Protocol Security (IPsec) protocol.

4. The method of claim 1, wherein the first server system sending packets comprises the first server system sending packets having one of Authentication Header (AH) and Encapsulating Security Protocol (ESP) headers containing the sequence numbers.

5. The method of claim 1, further comprising resetting a current inbound sequence number maintained by the first server system in response to detecting failover from the second server system to the first server system.

6. The method of claim 5, further comprising resetting a mask value associated with the current inbound sequence number in response to detecting failover from the second server system to the first server system, wherein the mask value is to identify sequence numbers within a sliding anti-replay window that have been received by the first server system, and wherein resetting the current inbound sequence number causes the sliding anti-replay window to shift.

7. The method of claim 6, further comprising an anti-replay control logic in the first server system using the current inbound sequence number and reset mask value to provide anti-replay protection.

8. The method of claim 1, wherein the sequence numbers in the first sequence number space in the packets sent by the first server system to the client system allow the client system to accept the packets sent by the first server system after failover without dropping any of the packets sent by the first server system.

9. The method of claim 1, wherein providing the first sequence number space and sending packets having sequence numbers in the first sequence number space are performed by a Virtual Private Network (VPN) server in the first server system.

10. A first server system, comprising:
    an interface to communicate with a client system over a network;
    failover control logic to enable failover from a second server system to the first server system;
    anti-replay control logic to detect duplicate sequence numbers within a sliding window, wherein the sequence numbers are defined by a security protocol, and wherein the sliding window is based on a current inbound sequence number maintained by the first server system; and
    reset logic responsive to failing over of the second server system to the first server system to reset the current inbound sequence number.

11. The first server system of claim 10, wherein the anti-replay control logic detects duplicate sequence numbers in the sliding window further based on a mask value indicating which sequence numbers within the sliding window have been received, and
    wherein the reset logic is responsive to failing over of the second server system to the first server system by further resetting the mask value.

12. The first server system of claim 10, further comprising a sequence number counter to increment sequence numbers in successively transmitted packets, wherein the sequence number counter operates within a first sequence number space different from a second sequence number space assigned to the second server system.

13. The first server system of claim 12, wherein the first and second sequence number spaces form different portions of a total sequence number space defined by a number of bits of a sequence number.

14. The first server system of claim 12, wherein each of the sequence numbers in the first sequence number space is larger than any of the sequence numbers in the second sequence number space.

15. The first server system of claim 10, wherein resetting the current inbound sequence number causes the sliding window to shift.

16. An article comprising at least one storage medium containing instructions that when executed cause a first server system to:
    enable failover from a second server system to the first server system;
    provide a first sequence number space in the first server system that is different from a second sequence number space in the second server system, wherein the first and second sequence number spaces are part of a total sequence number space; and
    after failover from the second server system to the first server system, send, to a client system, packets having sequence numbers in the first sequence number space, wherein the sequence numbers are defined by a security protocol, wherein the sequence numbers in the first sequence number space contained in the packets sent by the first server system to the client system differ from sequence numbers in the second sequence number space in packets sent by the second server system to the client system prior to the failover.

17. The article of claim 16, wherein sequence numbers in the first sequence number space are larger than sequence numbers in the second sequence number space to enable a client system to accept the sent packets from the first server system, where the client system previously received packets from the second server system that contained sequence numbers in the second sequence number space prior to the failover.

18. The article of claim 16, wherein the instructions when executed cause the first server system to further:
reset a sliding anti-replay window of the first server system in response to the failover.

19. The article of claim 18, wherein the instructions when executed cause the first server system to further:
reset a mask value associated with the anti-replay window in response to the failover.

20. The article of claim 16, wherein sending the packets comprises sending the packets containing security headers containing the sequence numbers.

21. The article of claim 20, wherein the security headers comprise one of Authentication Header (AH) and Encapsulating Security Protocol (ESP) headers containing the sequence numbers.

\* \* \* \* \*